United States Patent [19]

La Point

[11] 3,892,563

[45] July 1, 1975

[54] METHOD AND APPARATUS FOR SEPARATING THE CONSTITUENTS OF LEAD-ACID STORAGE BATTERIES

[75] Inventor: Albert E. La Point, Socorro, N. Mex.

[73] Assignee: Albert E. La Point, Socorro, N. Mex.

[22] Filed: May 14, 1973

[21] Appl. No.: 359,732

[52] U.S. Cl. ................ 75/97; 75/121; 75/149; 209/3; 209/172.5; 241/20; 241/24; 423/92; 423/93; 423/98; 23/260; 23/269
[51] Int. Cl. .................... B02c 9/00; C22b 7/00
[58] Field of Search ............ 241/15, 20, 24, 25, 30; 75/97 A, 97 R, 121, 149; 423/89, 92, 93, 98; 209/3, 172.5

[56] References Cited
UNITED STATES PATENTS

| | | | |
|---|---|---|---|
| 1,587,623 | 6/1926 | Zuckerman | 241/20 |
| 2,065,408 | 12/1936 | Suedsen | 423/95 |
| 3,004,721 | 10/1961 | Notzold | 241/24 |
| 3,393,876 | 7/1968 | Elmore | 241/20 |
| 3,493,183 | 2/1970 | Fischer et al. | 241/24 |
| 3,561,684 | 2/1971 | Fischer et al. | 241/42 |
| 3,679,395 | 7/1972 | Smyers et al. | 75/149 X |
| 3,777,994 | 12/1973 | Fischer | 241/24 |

*Primary Examiner*—Herbert T. Carter
*Attorney, Agent, or Firm*—Robert M. Betz; Richard A. Bachand

[57] ABSTRACT

Whole or shredded lead-acid batteries, together with a quantity of sodium carbonate and water, are fed continuously into a rotating drum separator containing a charge of grinding balls. Agitation of the mixture, aided by the internal drum construction features, further breaks up and degrades the battery fragments, neutralizes any contaminating electrolyte, transposes the finer particles of lead sulfate into lead carbonate, and forms a heavy-medium suspension of the active material on which organic battery fragments float. The suspension of active material constantly overflows from the drum at one end and carries the organic fragments with it into a first trommel, while sinkable fragments of grid metal and other battery parts of lower grade antimonial lead alloy are mechanically removed at the opposite end and deposited in a second trommel. A portion of the overflowing suspension is pumped back to the drum together with a regulated quantity of water, while the remainder is delivered to a thickener for further processing.

15 Claims, 7 Drawing Figures

METHOD AND APPARATUS FOR SEPARATING THE CONSTITUENTS OF LEAD-ACID STORAGE BATTERIES

BACKGROUND OF THE INVENTION

1. The Field of the Invention.

This invention relates generally to a method and apparatus for segregating the constituents of scrapped lead-acid storage batteries. More particularly, the invention is concerned with the hydromechanical separation of the components of lead-acid batteries into three distinct categories, (1) grid metal and other lower grade antimonial lead alloys, (2) active material, consisting of elemental lead, lead oxide and lead sulfate and (3) battery cases and separators consisting of organic material. Still more particularly the invention is concerned with combining such physical separation with simultaneous chemical treatment of the lead sulfate and neutralization of the electrolyte in such lead-acid batteries in order to facilite further recovery of the lead values therein.

2. Description of the Prior Art:

The recovery of lead and lead components in scrapped lead-acid batteries according to known methods typically involves first draining the batteries to eliminate the electrolyte therein and then crushing, guillotining, or otherwise fragmentizing the batteries to expose their plates. At his point the plates can be treated either by smelting or by mechanical separation of the active material from the grids. The latter technique is preferable not only because smelting is basically an inefficient method resulting in lead losses, but also because it gives rise to serious and potentially dangerous pollution problems.

There are a number of processes and types of apparatus known to the art which are designed to mechanically separate or isolate the constituents of whole or fragmented batteries, and a variety of well known techniques are employed in such processes and apparatus in varying combinations and with varying degrees of complexity.

For example, as exemplified in U.S. Pat. No. 3,561,684, a method and apparatus is disclosed for separating the components of secondary cells comprising means including an impact crusher for breaking up battery cases; vibrating screen equipment for dividing this mass into one fraction which comprises the separators and a second fraction comprising at least the major part of the housing and also the metallic fragments; further impact crusher means including a magnetic separator for removing ferrous material from the separators, further screen means for removing residues of grid lead still adhering to the separators, resonance screen means for additional separation of the second fraction of battery fragments by size, gravity separating means for further division of the smaller particles passing through the resonance screen into grid lead active material and plastic parts, and further gravity means for separating the larger particles of the second fraction into (1) sinkable grid material, some active material and other metallic parts and (2) flotable housing fragments.

The efficiency of such a method is necessarily degraded by the proliferation of equipment which must be employed and the consequent space requirements, as revealed by the flow-chart in this patent.

Obviously, it is desirable in this highly competitive field to devise a method and apparatus for recovering lead values from storage batteries which reduces the initial capital outlay and operating costs to a minimum. Clearly, therefore, an important characteristic of such method and apparatus ought to be the maximum simplicity in processing consistent with the production of lead values of high purity.

A further disadvantage of prior art methods for recovery of lead-acid battery constituents is that it is found necessary to remove substantially all the electrolyte from the battery cells prior to introduction into crushing or fragmentation vessels unless they are made acid resistant, which is ordinarily impractical. For example, in the method of U.S. Pat. No. 3,493,183 battery cells are first delivered to an acid resistant storage area provided with special drainage means for the acid. Subsequently, acid still adhering to the battery fragments is largely removed by a dewatering process. Only then are the fragments ready for mechanical separation to obtain lead values.

In another known mechanical method of recovery of battery constituents, as exemplified in U.S. Pat. No. 1,587,623 grid plates and pasted oxides are crushed together in a ball mill in the presence of water, which serves as a vehicle to flow out the crushed fragments into a screen separator. The oxides suspended in the water are passed through the screen and conducted to settling tanks, while the metal chunks, consisting of antimonial lead, are retained on the screen, washed and collected. This method of course requires that steps be taken elsewhere to extract the grid plates from scrapped batteries, and it is therefore not designed to handle whole or shredded batteries including cases and separators, electrolyte, and other battery parts. Furthermore, since all of the crushed material is passed onto the screen separator with the suspension of active material, the finer particles of grid metal will pass through the screen and contaminate the active material unless the mesh of the screen is made very fine, which in turn increases the probability of blockage of the screen by moist particles.

In a used battery the active material contains a large proportion of lead sulfate which must be removed in order to recover reusable lead values. It is well known that the lead sulfate can be transposed to lead carbonate by chemical reaction with carbonate solutions such as sodium carbonate. In a known process as exemplified in U.S. Pat. No. 2,065,408 such transposition is accomplished in a rotary vessel in which scrap battery plates are tumbled at the same time. The reaction takes place in water at near boiling temperature and requires 30 to 60 minutes for completion. The disadvantage of this method lies in the excessive time and high water temperature necessary for the reaction as well as the fact that it is a cyclic process, i.e., not adapted to operate continuously.

SUMMARY OF THE INVENTION

It is a general object of the invention to provide a completely self-contained, non-polluting, hydromechanical method and apparatus for lead-acid battery constituent separation which performs simultaneously several important steps in such separation, heretofore performed successively, by combining a multiplicity of separate processing stations into a single, all-purpose processing stage.

It is a more specific object of this invention to provide such a method and apparatus which is adapted to process either whole or shredded batteries to separate the constituents thereof into three distinct and substantially uncontaminated streams of antimonial lead, active material and organic material.

It is another object of this invention to provide such a method and apparatus which combines the hydromechanical separation of the battery constituents with chemical treatment to eliminate lead sulfate and battery acid in the same processing vessel.

It is believed that the gains achieved by this new method and by the apparatus to be described for its implementation are significant in terms of the cost at which lead values of high purity may be recovered and for the completely non-polluting character of such method and apparatus.

In accordance with one aspect of this invention there is provided a method for separating the constituents of lead-acid batteries of the type having grid plates of antimonial lead, other lower grade alloy parts, active material consisting of lead, lead oxide, and lead sulfate, and organic material consisting of the battery case and separators.

In this method, whole or shredded lead-acid batteries, together with a quantity of sodium carbonate and water are fed into a rotating drum separator. Agitation of the mixture, aided by internal drum features seves (a) to further fracture and degrade the battery fragments; (b) to form a bath or slurry in which fine particles of active material create a pseudo-heavy density liquid adapted to float the organic material thereon and to permit the remaining battery fragments to sink; (c) to transpose the finer lead sulfate particles into lead carbonate; and (d) to neutralize any battery acid which contaminates the slurry. The heavy medium suspension together with the organic material continually overflows from the drum through one drum opening onto a first separating screen adapted to retain the organic material and pass the suspension therethrough. The remaining sinkable fragments, consisting mainly of grid metal, are concentrated and discharged from a separate drum opening onto a second screen for further segregation by size. A portion of the overflowing suspension of active material is recirculated to the drum together with a regulated amount of water to maintain proper density in the suspension and to establish a current therein to help sweep the floating plastic material from the drum, while the remainder of the overflowing suspension is pumped to a thickener for further processing of the active material concentrate.

The invention is also embodied in the particular apparatus for carrying out the above method. The separator comprises a rotatable drum having first and second opposite ends, the first end being provided with a combined feed and discharge opening and the second end being provided with a separate discharge opening. A first and second trommel are affixed externally to the first and second ends of the drum fitting over the respective openings therein. Prior to operation a charge of grinding balls is placed in the drum. Means are provided for continuously or intermittently feeding whole or shredded batteries into the drum through the opening in the first end together with a predetermined quantity of sodium carbonate and water. Means are provided for rotating the drum within a range of velocity for proper fragmentation of the batteries and avoidance of centrifuging. Gravity means are provided for discharging organic fragments, together with a fraction of the resultant suspension of active material, through the opening in the first end into the first trommel. A helical scroll on the internal drum surface, aided by longitudinal lifter bars, advances sinkable battery fragments toward the second or opposite end of the drum until obstructed by a transverse baffle plate which restricts further passage to all material larger than predetermined size. The larger fragments are therefore concentrated for efficient breakup by the grinding balls while means are provided for lifting the smaller fragments and deflecting them outward through the opening in the second end into the second trommel. Fixed shrouds surrounding the first and second trommels are provided with collecting hoppers connected to external system plumbing, by means of which washed and screened organic material, grid metal and other antimonial lead alloy fragments are conveyed to separate storage bins. The active material suspension overflowing into the first trommel screen is in part returned through suitable external piping to the drum through the opening in the second end and in part pumped to a thickener.

The details of the method and apparatus of this invention together with other objects and advantages thereof will be better understood by considering the following description of a preferred embodiment together with the accompanying drawings. The particular features of the invention which are regarded as novel are set forth in the appended claims.

DESCRIPTION OF THE PREFERRED EMBODIMENT

Figure 1:
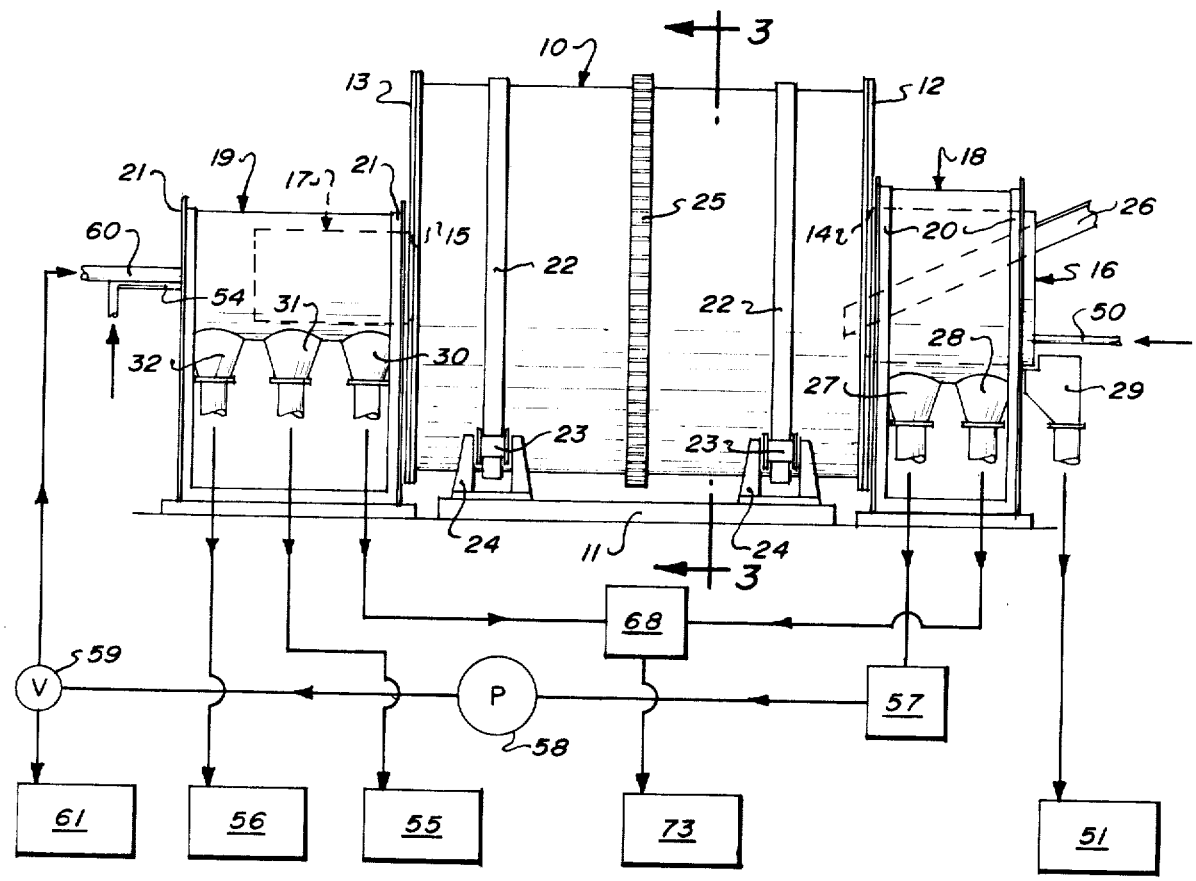
FIG. 1 is an elevational view of the rotatable drum separator of this invention showing the external connections at its two ends.

Referring now to FIG. 1, the drum separator of this invention consists generally of a rotatable cylindrical drum 10 of any convenient size, mounted on a base 11. The opposite end plates 12 and 13 of the drum 10 are provided with circular openings 14 and 15 which communicate respectively with the externally mounted cylindrical trommels 16 and 17 (seen in dotted outline). The trommels 16 and 17 are fitted tightly to the end plates 12 and 13 over the openings 14 and 15 and extend within stationary shrouds 18 and 19 which are supported above the base 11 on uprights 20—20 and 21—21 respectively. In order to facilitate rotation of the drum 10, a pair of annular guide rails 22—22, welded or otherwise fixed to its outer surface, are adapted to rest against rollers 23—23, of which there are a total of four, axially supported within brackets 24—24. Drive means, to be discussed, are adapted to engage a sprocket 25 encircling the middle of the drum 10.

Feed chute 26, supported independently of the drum 10 by any suitable means (not shown), extends downwardly through the trommel 16 and into the drum 10 through the opening 14. Whole or fragmented batteries are deposited in the feed chute 26 and fed into the drum 10, and as will become apparent, the feed chute 26 should extend far enough into the drum 10 to deposit the batteries or fragments thereof well inward of the opening 14.

The shroud 18 is provided with collecting hoppers 27, 28, and 29 while the shroud 19 is provided with similar collecting hoppers 30, 31, and 32. In operation, these hoppers serve to further channel and direct fluids and solid battery fragments leaving the drum 10 and passing downward through the screens of trommels 16 and 17 or urged longitudinally outward from the drum 10 through such trommels.

Figure 2:
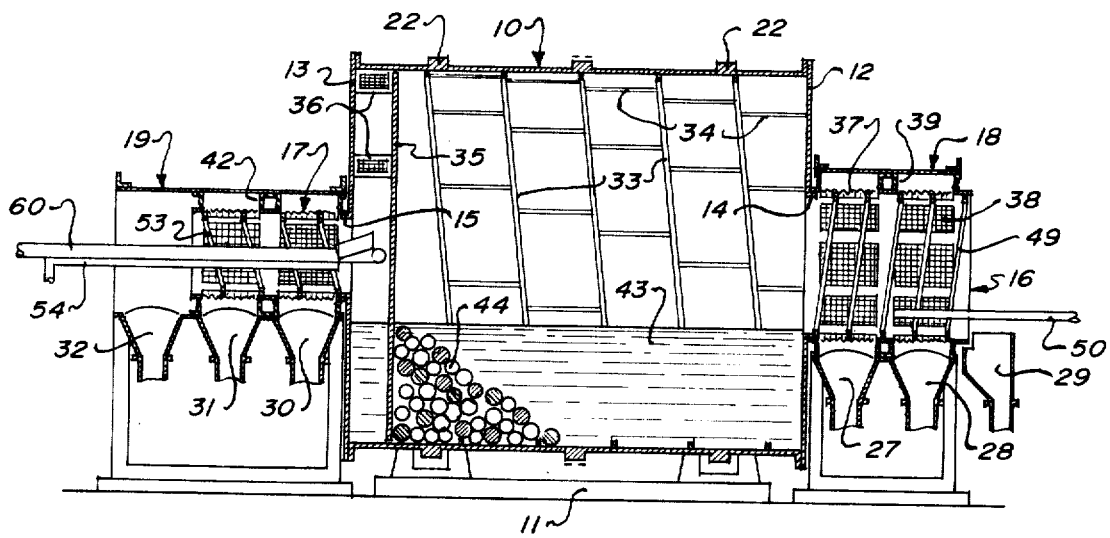
FIG. 2 is a vertical sectional view of the drum separator.

The internal construction of the drum 10 can best be understood by examination of FIG. 2. An internal scroll 33, adapted to advance solid particles, extends in a helical path along the inner drum periphery from a point adjacent the end plate 12 and terminates inward of the end plate 13. The scroll 33 may be of generally rectangular cross section with the larger dimension generally perpendicular to the surface of the drum 10. Longitudinal lifter bars 34—34 are randomly spaced between adjacent turns of the scroll 33.

A transverse circular baffle plate 35 extends across the drum 10 near the end plate 13, to which it is attached by means of a plurality of radially extending lifter bars 36—36. The baffle plate 35 is slightly smaller in diameter than the drum 10 and positioned concentrically therwith so that liquids and smaller solid fragments can move past it in either direction. It is also preferable to align the baffle plate 35 approximately with the end of the scroll 33 which approaches the end plate 13. Note also that the openings 14 and 15 are arranged symmetrically with respect to the longitudinal axis of the drum 10 and that the diameter of the opening 14 is greater than that of the opening 15. This insures that fluids introduced within the drum 10 will overflow by gravity only through the opening 14, while separate mechanical means will be required to discharge materials through the opening 15, as will be explained.

Figure 4:
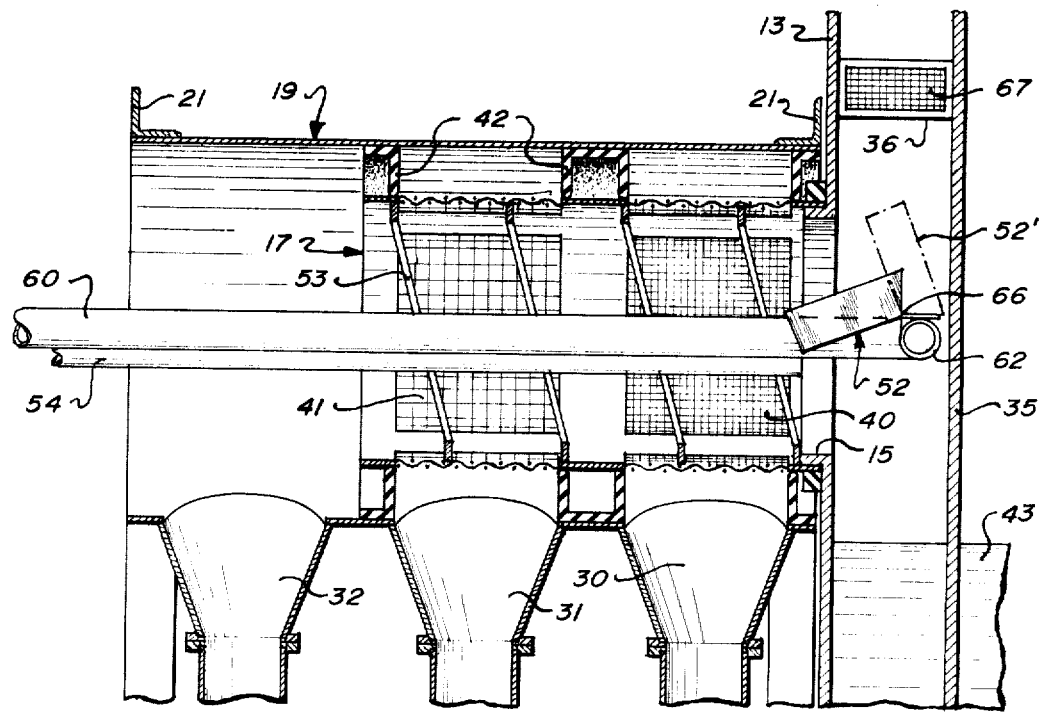
FIG. 4 is an enlarged sectional view of the left hand end of the drum as seen in FIG. 2 together with external attachments thereto.

The trommel 16 is provided with two sets of screens 37—37 and 38—38 conveniently arranged along two parallel cylindrical paths communicating respectively with the hoppers 27 and 28. It is preferable to construct all screens 37—37 and 38—38 of a 20-mesh size. Rubber grommets 39—39 are inserted between the trommel 16 and shroud 18 at their two ends to prevent leakage of fluids along the outside of the drum 10 and the shroud 18 and also betwen the hoppers 27 and 28 to prevent cross spillage between these hoppers. As best seen in FIG. 4, the trommel 17 is provided with first set of 20-mesh screens 40—40 communicating with the hopper 30 and a second set of 1-mesh screen 41—41 communicating with the hopper 31. Rubber grommets 42—42 act to prevent leakage at the two ends of the trommel 17 and to prevent spillage between hoppers 30 and 31.

Referring again now to FIG. 2, in preparing for operation the drum 10 may be first partially filled with water to form a bath 43. Additionally, a charge of grinding balls 44—44 is placed within drum 10 as in a conventional ball mill, the diameter of the balls being at least large enough to prevent their escape around the periphery baffle plate 35. The balls 44—44 may be constructed of steel or antimonial lead, the number and weight thereof being matters of choice depending upon factors such as the size of drum 10, its speed of rotation, and the character of the battery material to be degraded.

Figure 3:
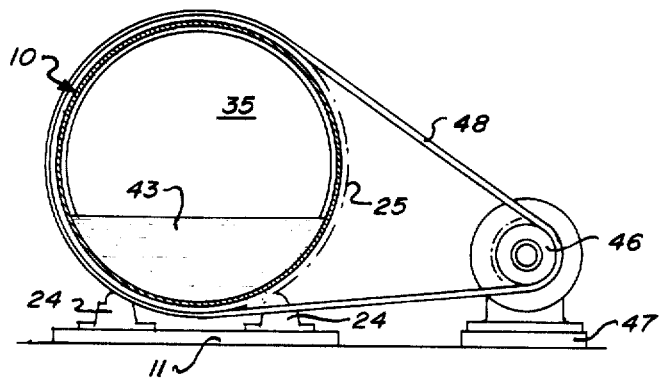
FIG. 3 is a section taken on line 3—3 in FIG. 1 showing connections between the drum separator and suitable drive means.

The drum separator 10 is now rotated at a low speed, for example about 7 to 10 rpm for a five foot diameter drum. This may be accomplished by means of any suitable power source (not shown) adapted to turn a drive sprocket wheel 46, as seen in FIG. 3, mounted on a support 47 and which is connected to sprocket 24 through a linked chain 48 or any other suitable drive mechanism. Previously shredded or whole batteries are then fed into the drum 10 on the feed chute 26 through the opening 14 together with a quantity of sodium carbonate, in such a manner as not to interfere with the passage of floating solids and fluids in the opposite direction through said opening. Water may be added prior to the introduction of the batteries as noted above or this may be accomplished at the same time.

The batteries are now subjected to a variety of separating mechanisms. The organic material, which is made up of plastic battery housings and separators will float immediately upon release from other inorganic battery parts. This is because the finely divided active material when mixed with water and agitated by the drum rotation forms a pseudo-heavy density liquid or "heavy media" suspension whose density is higher than that of the organic material. By taking advantage of the different settling rates of particles of different size and specific gravities, the suspension may be so controlled that all remaining larger inorganic battery fragments and materials, including grid metal and other lower grade lead alloy parts such as poles, straps and connectors will sink to the bottom of the drum 10.

Under agitation and aided by the constant recirculation of a portion of the suspension the level of the bath 43 is maintained above the lower lip of the larger opening 14 and thus splashes or otherwise overflows constantly into the trommel 16, carrying with it some of the floating organic material. The trommel 16 has an internal peripheral discharge screw 49 pitched to carry the suspension and organic material away from the drum 10. As it passes over the first set of cylindrical screens 37—37 immediately adjacent to the opening 14, the organic material will be retained thereon and most of the suspension of active material will pass through to the hopper 27. As the organic material is advanced over the second set of screens 38—38 by the action of the screw 49, it is sprayed with water from a separately supported spray nozzle 50 which extends longitudinally within the trommel 15. This will remove any remaining active material clinging to the organic material and deposit it in the hopper 28. The organic material is then pushed out through the open end of the trommel 16 by the continued action of the screw 49 and deposited in a storage bin 51 (FIG. 1).

Returning now to the internal action in the drum 10, the longitudinal lifter bars 34—34 raise both the griding balls 44—44 and the larger sinkable battery fragments, consisting mainly of grid metal and other lower grade lead alloy parts, out of the bath 43 to a height dependent on drum speed and diameter, from which they fall back into the pulp or suspension. This motion both cleans and fractures the grid metal. The battery grids quickly loose most of their attached active material by the combined action of the water and the tumbling and shearing motion brought about by the drum rotation. The speed of rotation of the drum 10 must be sufficient to maintain finer active material in suspension but not so great as to create centrifuging of solid fragments.

As the drum rotates, the scroll 33, aided by the action of the lifter bars 34—34, moves both solid battery fragments and grinding balls 44—44 toward the end plate 13 until they meet an obstruction in the form of the baffle plate 35. Since the grinding balls 44—44 are too large to pass this obstruction they tend to concentrate on the battery feed side of it where they perform their function of further breaking up and degrading the battery materials. Conversely, fragments of grid metal, including any larger particles of active material not in suspension, plus posts and straps move readily past the baffle plate 35 and are then picked up by the peripheral lifter bars 36—36. As best seen in FIG. 4, when the grid metal and other metal fragments are carried to the top of the drum 10 by these lifter bars 36—36 they are dropped on a sloping deflector plate 52 and deposited thereby in the trommel 17. The trommel 17 is provided with an internal discharge screw 53 pitched to carry material away from the drum 10. As the material passes over the first set of screens 40—40 it is washed with water from an independently supported spray nozzle 54 to remove any active material clinging thereto which then passes to the hopper 30. When the material is drawn across the second set of screens 41—41, their coarser 1 inch mesh is large enough to permit the grid metal to pass through into hopper 31 and thence into another suitable storage bin 55 (FIG. 1). Finally, larger fragments of lower grade antimonial lead alloy material such as posts, straps and connectors leave the end of the trommel 17 through the continued advancing action of the discharge screw 53 and are deposited in the hopper 32 from which they may be fed to still another storage bin 56 (FIG. 1).

Returning now to FIG. 1, the suspension of active material which passes through the hopper 27 is collected in a sump 57 from which it is picked up by a centrifugal pump 58 of a type well known to the art compatible with the consistency of the suspension. With regulation by a control valve 59, part of the suspension is returned to the end plate 13 of the drum through the recirculation pipe 60 while the remainder is collected in a thickener 61 for further processing of the active material concentrate in accordance with known techniques.

The recirculation of the active material serves two important functions. In the first place it allows positive control of the suspension density in the bath 43, which is preferably maintained at from 1.4 to 2.0. To regulate the water content of this recirculated material, the spray nozzle 50 may be adjusted within the trommel 16 so that it directs a high velocity stream of water through the screens 37—37 and into the hopper 27 to dilute the suspension in the sump 57. In the second place, as the recirculated material flows in to the main part of the drum 10 past the edge of the baffle plate 35, it establishes a current within the bath 43 which keeps the organic material floating thereon moving in the direction of the end plate 12 and thus helps to sweep such organic material out of the opening 14.

Figure 5:
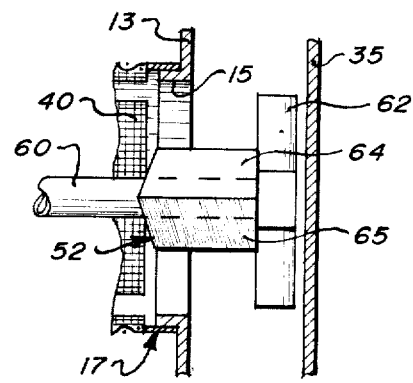
FIG. 5 is a plan view of the recirculation pipe and deflector plate assembly.

As best seen in FIGS. 4 and 5, the recirculation pipe 60 is brought in to the drum 10 through the trommel 17 and terminates close to the baffle plate 35 in a horizontal T-bar 62 open at both ends to eject the suspension of active material. The recirculation pipe 60 forms a convenient support for the deflector plate 52 which is seen to consist of a pair of slanted surfaces 64 and 65 joined at their upper edges. The deflector plate 52 is provided with a hinge 66 fastened to the upper surface of the T-bar 62 so that it may be raised to a nonfunctional position 52' during the start up of the operation. This will prevent discharge of battery material from the drum 10 at end plate 13 until proper equilibrium conditions have been established.

FIG. 4 also shows in enlarged detail, one of the peripheral lifter bars 36—36, illustrating an optional screen 67 which may be incorporated in each of said lifter bars 36—36, illustrating an optional screen 67 which may be incorporated in each of said lifter bars 36—36 to allow smaller particles of active material to drop back in to the bath 43 as larger solid fragments of grid metal are being lifted thereby.

As previously stated, when the batteries are fed into the drum 10 a quantity of sodium carbonate or other suitable carbonate equivalent to approximately 1 pound for each 10 pounds of lead and lead oxides in the batteries is added at the same time. The sodium carbonate reacts quickly with fine lead sulfate particles in the active material to transpose them to lead carbonate. If the transposition is not completed in the drum 10 the chemical change continues as the particles move out of the drum through the pump 58 and either into the thickener 61 or back into the drum 10. One important advantage of employing the drum 10 as a chemical reaction chamber is that the reaction between sodium carbonate and lead sulfate takes place much more rapidly on the surface of freshly fractured particles which are also at a slightly elevated temperature as a consequence of friction and impaction. Another important advantage of this technique is that it permits the processing of batteries in accordance with this invention without prior draining of electrolyte. The sodium carbonate will serve to neutralize any acid which contaminates the bath 43 and thus eliminates the need for a separate area in which to perform the acid removal step.

Any small particles of active material passing into the hoppers 28 and 30 are collected in a sump 68 from which they may optionally be channeled either to the thickener 61 or a separate container 73. The probability of contamination in the form of grid metal is higher in the active material collected in this manner than it is in the suspension fraction leaving the drum 10 at the hopper 27. Thus the required degree of purity of concentrate obtained from the thickener 61 will affect this choice.

Some of the larger particles of active material leave the drum 10 with the grid metal. After drying, this grid metal may be melted in a furnace and poured into ingots. The accompanying particles of active material are not decomposed at the melting temperature of grid metal. Instead, they form a dross on the surface of the melt which can be skimmed off before the ingots are poured. This dross may be then returned to the drum 10 where it quickly crumbles to fine particles which react immediately with sodium carbonate to form lead carbonate.

Figure 6:
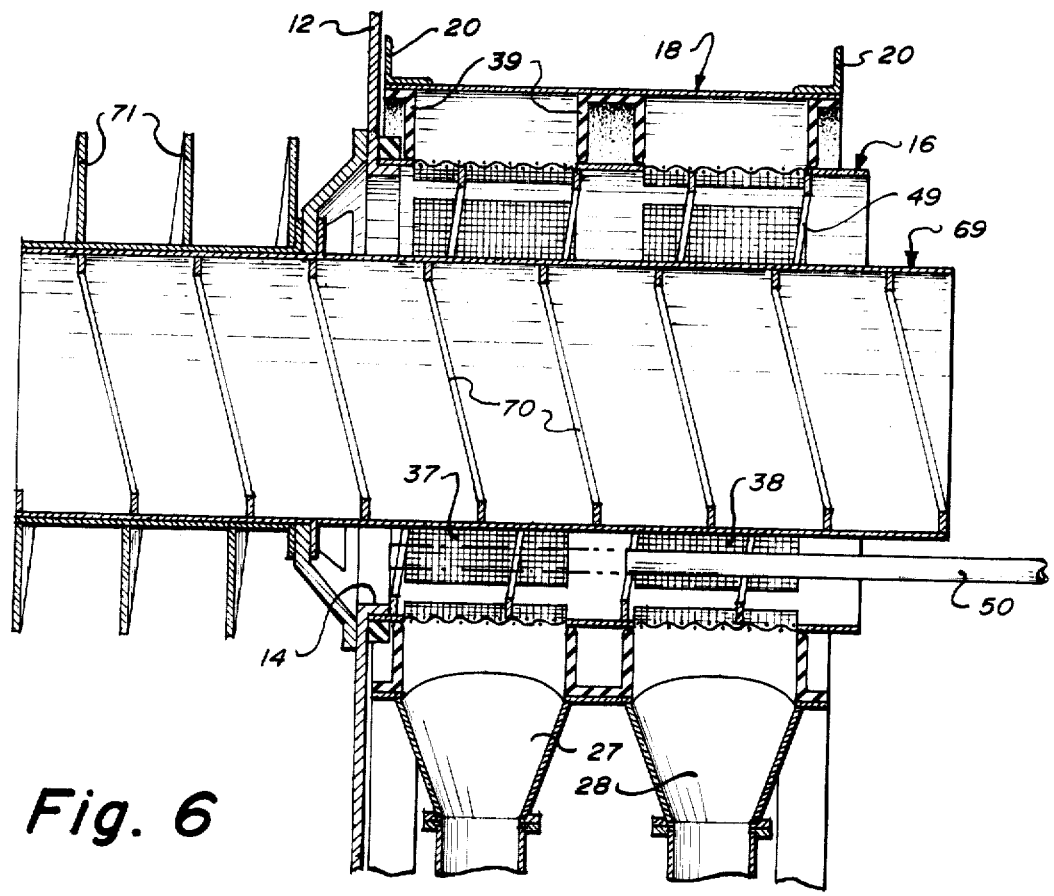
FIG. 6 is an enlarged detail of a modified feed pipe arrangement at the right hand end of the drum separator as seen in FIG. 2.

A modified battery feed device is illustrated in FIG. 6 including a cylindrical feed pipe 69 fixedly supported within and rotatable with the trommel 16. An internal scroll 70 in pipe 69 is pitched to advance shredded batteries into the drum 10. Similarly, an external scroll 71 extending over that portion of the surface of feed pipe 69 within the drum 10 is pitched to skim organic material from the surface of the bath 43 and move it in the opposite direction, thereby assisting the natural flow into trommel 16.

Figure 7:
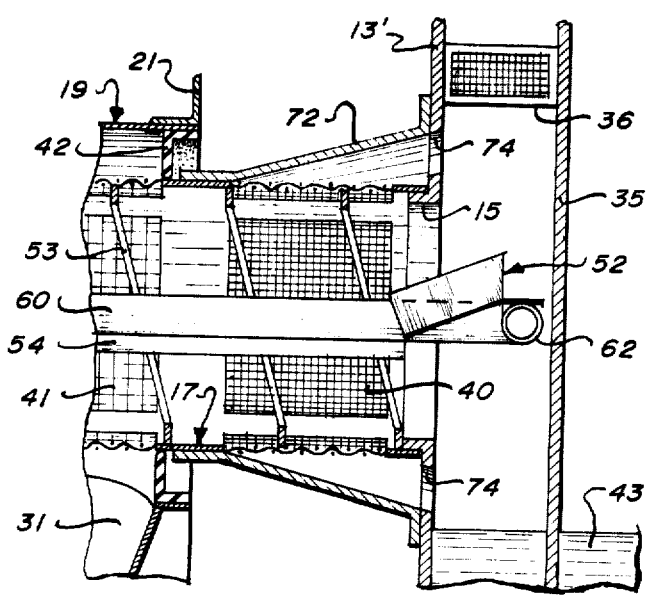
FIG. 7 is an enlarged detail of a modified form of shroud at the left hand end of the drum separator as seen in FIG. 2.

A further modification of the shroud 19 at the end plate 13 is illustrated in FIG. 7. The hopper 30 (FIG. 1) is eliminated and replaced by a solid frusto-conical shroud 72 having its smaller end fastened to the outer surface of the trommel 17 and its larger end mounted to the outer surface of a modified drum end 13'. When metallic fragments are washed on screens 40—40 in the manner previously described, the active material passing through will be returned directly into the drum 10 through a series of large holes 74 in the end plate 13' spaced radially outward of the periphery of the trommel 17.

In the manner described herein, it is now seen that the method and apparatus of this invention is effective to separate the lead-acid battery fragments obtained thereby into three distinct consituent streams, in a single processing stage, namely, (1) active material in suspension, (2) organic material, and (3) grid metal and other antimonial lead alloy fragments, the first two streams leaving the drum 10 through the opening 14 and the third stream leaving through opening 15. The purity of the metallic and oxidic lead values if found to be high and immediately marketable without additional processing.

While the invention has been described as embodied in a particular method and apparatus for separating the constituents of lead-acid storage batteries, the foregoing is intended to be illustrative only and not limiting. Those skilled in this art will have no difficulty in making further modifications and adaptations of such invention without departing from the scope of such invention.

What is claimed is:

1. The method of separating the constituents of a lead-acid storage battery of the type having at least grid plates of antimonial lead, active material consisting of lead, lead oxide and lead sulfate, a case and separators of organic material and acid, comprising the steps of:
   a. crushing whole batteries into fragments in a ball mill in the presence of water and sodium carbonate, to form with the active material a heavy medium suspension of density in which the organic material floats and the fragmented grid plates sink; and to react the sodium carbonate chemically with the lead sulfate to transpose it into lead carbonate and to neutralize the acid;
   b. the organic material and the suspension continually through an opening at one end of the ball mill onto a first screen adapted to retain the organic material and to pass the suspension therethrough;
   c. advancing the fragmented grid plates toward the opposite end of the ball mill; and
   d. discharging said fragmented grid plates mechanically through an opening in said other end of the ball mill onto a second screen adapted to retain said fragmented grid plates and pass therethrough any active material adhering thereto, thereby separating the battery constituents into three distinct streams consisting respectively of antimonial lead, active material and organic material.

2. The method of separating the constituents of lead-acid storage batteries of the type having grid plates of antimonial lead, active material consisting of lead, lead oxide and lead sulfate, and cases and separators of organic material which comprises the steps of:
   a. charging a cylindrical drum with a quantity of grinding balls;
   b. feeding the batteries into the drum together with water;
   c. rotating the drum to fragmentize the batteries by impact with the grinding balls, and to agitate the water to form with a portion of the particles of active material a heavy medium suspension of density in which the organic materials floats and the remaining battery fragments including the grid plates sink;
   d. removing the organic material and a fraction of the suspension from the drum through an opening at one end thereof;
   e. thereafter passing said organic material and suspension fraction over a first trommel screen adapted to retain the organic material and pass the suspension therethrough;
   f. advancing the remaining fragments toward the other end of the drum;
   g. segregating said remaining fragments by size into smaller and larger fragments;
   h. discharging said smaller fragments through an opening in said other end; and
   i. passing said smaller fragments over a second trommel screen adapted to retain smaller fragments and pass therethrough any active material adhering to said smaller fragments.

3. The method of separating the constituents of a lead-acid storage battery of the type having at least grid plates of antimonial lead, active material consisting of lead, lead oxide and lead sulfate, and cases and separators of organic material which comprises the steps of:
   a. charging a cylindrical drum with a quantity of grinding balls;
   b. feeding the batteries into the drum together with sodium carbonate and water;
   c. rotating the drum to fragmentize the batteries by impact with the grinding balls; and agitate the water to form with the finer particles of active material a heavy medium suspension of density in which the organic material floats and the remaining battery fragments including the grid plates sink; and to transpose the finer particles of lead sulfate into lead carbonate;
   d. removing the organic material and a fraction of the suspension from the drum through an opening at one end thereof;
   e. thereafter passing said organic material and suspension fraction over a first trommel screen adapted to retain the organic material and pass the suspension therethrough;

f. advancing the remaining fragments toward the other end of the drum;

g. segregating said remaining fragments by size into smaller and larger fragments;

h. discharging the smaller fragments through an opening in said other end; and i. passing said smaller fragments over a second trommel screen adapted to retain such smaller fragments and pass therethrough any active material adhering to said smaller fragments.

4. The method of claim 3 comprising the additional step of passing said smaller fragments over a third screen adapted to further segregate said smaller fragments by size into grid metal and other lower grade lead alloy parts.

5. The method of claim 3 wherein the step of removing the organic material and suspension fraction from the drum comprises causing said organic material and suspension fraction to overflow through the opening in said one end.

6. The method of claim 3 wherein the step of discharging the smaller fragments through the opening in said other end of the drum comprises lifting said smaller fragments adjacent said other end and then deflecting said smaller fragments through said opening.

7. The method of claim 3 comprising the further step of externally recirculating a portion of said suspension fraction from said one end of the drum into the other end thereof.

8. The method of claim 7 additionally comprising the step of adding water to said recirculated portion of said suspension fraction to maintain the density of said suspension fraction.

9. The method of claim 3 wherein the step of advancing said remaining fragments toward said other end of the drum comprises moving said remaining fragments by means of a spiral feed.

10. The method of claim 3 wherein the step of segragating said remaining fragments by size into smaller and larger fragments comprises internally baffling the drum intermediate the ends thereof so that the larger fragments are prevented from reaching the opening in said other end.

11. The method of claim 3 additionally comprising the step of concentrating said remaining fragments and said grinding balls in a confined space intermediate the ends of the drum during and after fragmentizing of said batteries.

12. The method of claim 3 comprising the further step of maintaining the level of said water in communication with the opening in said one end and below the opening in said other end.

13. The method of claim 3 comprising the further step of maintaining a current within the suspension in said drum in the direction of the opening in said one end.

14. The method of claim 3 wherein said first and second screens are each no larger than 20-mesh and said third screen is no larger than 1-mesh.

15. The method of claim 3 wherein an electrolyte in said batteries is neutralized in said drum by chemical interaction with sodium carbonate.

* * * * *

UNITED STATES PATENT OFFICE
CERTIFICATE OF CORRECTION

Patent No. 3,892,563            Dated    July 1, 1975

Inventor(s)    ALBERT E. LaPOINT

It is certified that error appears in the above-identified patent and that said Letters Patent are hereby corrected as shown below:

Column 1, line 29, "his" should be --this--;
Column 3, line 28, "seves" should be --serves--;
Column 9, line 63, (Claim 1, line 14) after "b." and before "the" (first occurrence) should be inserted --overflowing--.

Signed and Sealed this fourteenth Day of October 1975

[SEAL]

Attest:

RUTH C. MASON
*Attesting Officer*

C. MARSHALL DANN
*Commissioner of Patents and Trademarks*